United States Patent
Agraharam et al.

(10) Patent No.: US 6,941,373 B2
(45) Date of Patent: *Sep. 6, 2005

(54) NETWORK COMMUNICATIONS SYSTEM AND METHOD FOR WORLDWIDE WEB BROADCASTING

(75) Inventors: Sanjay Agraharam, Marlboro, NJ (US); Chia-Chang Li, Holmdel, NJ (US); Ram S. Ramamurthy, Manalapan, NJ (US); Peter H. Stuntebeck, Little Silver, NJ (US)

(73) Assignee: AT&T Corp., New York, NY (US)

( * ) Notice: Subject to any disclaimer, the term of this patent is extended or adjusted under 35 U.S.C. 154(b) by 624 days.

This patent is subject to a terminal disclaimer.

(21) Appl. No.: 10/090,764

(22) Filed: Mar. 6, 2002

(65) Prior Publication Data

US 2002/0091771 A1 Jul. 11, 2002

Related U.S. Application Data

(63) Continuation of application No. 09/111,301, filed on Jul. 7, 1998, now Pat. No. 6,389,471.

(51) Int. Cl.$^7$ .............................................. G06F 15/16
(52) U.S. Cl. ..................... 709/227; 709/228; 709/250
(58) Field of Search ................................ 709/227, 228, 709/223, 271; 707/250, 217; 725/19, 21, 14

(56) References Cited

U.S. PATENT DOCUMENTS

| | | | |
|---|---|---|---|
| 5,440,624 A | 8/1995 | Schoof, II | |
| 5,586,121 A | 12/1996 | Moura et al. | |
| 5,748,736 A | 5/1998 | Mittra | |
| 5,774,664 A | 6/1998 | Hidary et al. | |
| 5,818,845 A | 10/1998 | Moura et al. | |
| 5,832,229 A | 11/1998 | Tomoda et al. | |
| 5,852,714 A | 12/1998 | Tseng et al. | |
| 5,867,653 A | 2/1999 | Aras et al. | |
| 5,893,091 A | 4/1999 | Hunt et al. | |
| 5,905,865 A | 5/1999 | Palmer et al. | |
| 5,928,331 A | 7/1999 | Bushmith | |
| 5,961,603 A | 10/1999 | Kunkel et al. | |
| 6,092,111 A | 7/2000 | Scivier et al. | |
| 6,389,471 B1 * | 5/2002 | Agraharam et al. | 709/227 |

* cited by examiner

Primary Examiner—Larry D. Donaghue

(57) ABSTRACT

A system and method allow an Internet user to act as a broadcast session conductor by assembling audiovisual information in a multimedia document, and broadcasting that information to a predetermined group for simultaneous viewing. During the network broadcast, members of the predetermined group can interact with the Internet conductor using a standard telephone or other audio connection. The broadcast information may be used for such sessions as on-line training/teaching seminars, telemarketing, teleshopping and other multimedia events.

27 Claims, 5 Drawing Sheets

NETWORK COMMUNICATIONS SYSTEM AND METHOD FOR WORLDWIDE WEB BROADCASTING

This is a Continuation of application Ser. No. 09/111,301 filed Jul. 7, 1998 now U.S. Pat. No. 6,389,471. The entire disclosure of the prior application(s) is hereby incorporated by reference herein in its entirety.

BACKGROUND OF THE INVENTION

1. Field of Invention

The invention relates to network communications, and more particularly to a system which allows a user to prepare and broadcast information over the Internet to an audience of individuals, simultaneously.

2. Description of Related Art

Today, most information on a network such as the Internet is accessed in a passive manner, from the standpoint of the information source. That is, a user at a personal computer typically accesses the Internet through a dial-up service provider, and uses browsing software to "pull" information from Internet servers for viewing. Although commercial utilities and services are available which "push" information from the server side to subscribing users, they usually deliver the information for passive or off-line viewing.

In addition, most existing Internet access systems are designed only for one-to-one communications. That is, Internet users commonly communicate with web sites and receive information directly from web servers on a purely one-to-one basis. Thus, new technology is desirable to expand Internet communication techniques beyond simple one-to-one, passive types of communication.

SUMMARY OF THE INVENTION

The invention relates to a system and method for network communications which permit a network user such as an Internet user, acting as a session conductor, to broadcast in real time an interactive presentation to a predetermined group of users across the World Wide Web. The system and method of the invention allow the session conductor to retrieve information from network databases or other sources in real time and use that information to present a multimedia broadcast session. The session conductor directs the system to forward the multimedia session to the session audience at a designated time. Members of the session audience may choose to follow the presentation passively or actively participate in the presentation through a multimedia bridge.

BRIEF DESCRIPTION OF THE DRAWINGS

The invention will be described with reference to the following figures, in which like numerals refer to like elements, and wherein.

DETAILED DESCRIPTION OF PREFERRED EMBODIMENTS

Figure 1:
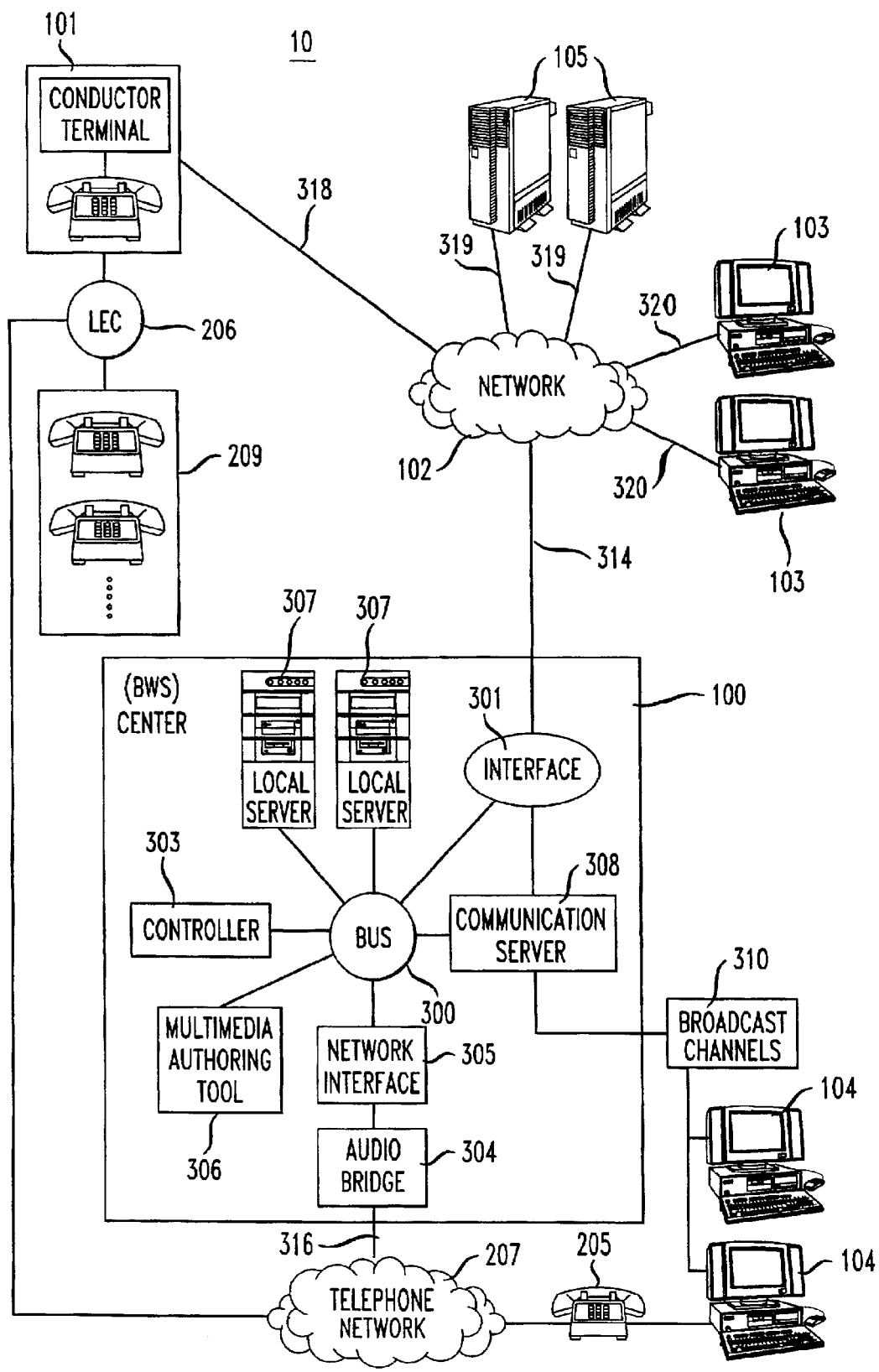
FIG. 1 shows a communications network adapted to broadcast information according to the invention.

FIG. 1 illustrates an embodiment of a network communication system 10 according to the invention. The network communication system 10 is in general a distributed, multiply linked system incorporating a variety of communication interfaces and connections of varying bandwidth. The system includes at least one conductor terminal 101, client terminals 103 and 104, and a Broadcast World Wide Web Service (BWS) Center 100 of which the major functions include the storage, formatting, scheduling, and transmission of a multimedia session to a desired audience of the client terminals.

Conductor terminal 101 and client terminals 103 and 104 can, for instance, be personal computers or workstations running under Windows, Unix or other commonly available operating systems. Client terminals 104 can also be other devices such as a DirecTV™ receiver or a WebTV unit. The client terminals 103 and 104 are coupled, directly or indirectly, to a network 102. Network 102 may be the Internet, or privately subscribed intranets or other communications networks. The client terminal 103 may be coupled to network 102 by conventional dial-up modem interfaces, for instance TCP/IP/PPP or other protocols known in the art. Remote servers 105 connected to network 102 over link 319 provide storage of and access to databases containing multimedia information.

Figure 4:
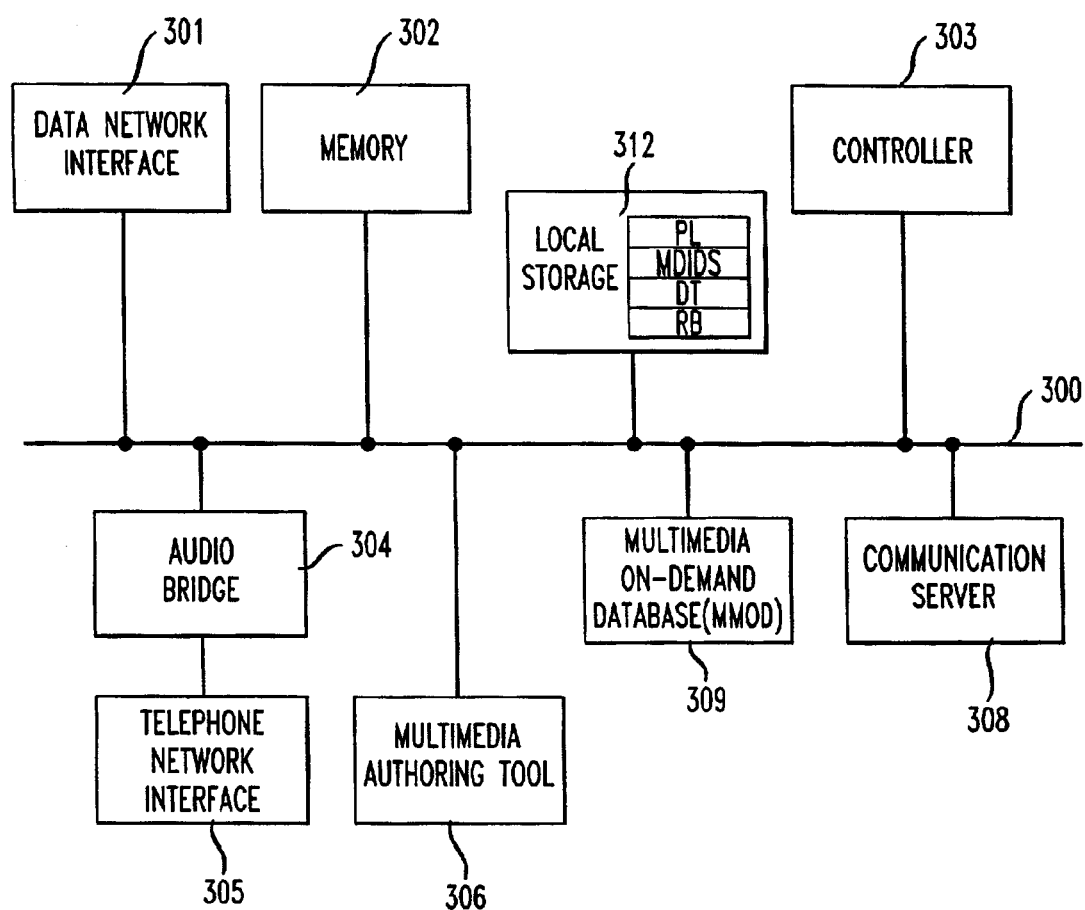
FIG. 4 shows components of a broadcast device.

A user, acting as session conductor, logs onto and operates the conductor terminal 101, as shown in FIG. 4, to access and edit multimedia information for a session using a multimedia authoring tool 306, such as the commercially available Macromedia Director software. The multimedia information to be used in a broadcast session may be created locally and stored in multimedia database 309 or drawn from the remote servers 105 over network 102, or imported from floppy drives, compact disks (CD), or other portable storage. The multimedia information may include text, graphical, video, audio or other information according to MPEG (Motion Pictures Experts Group), QuickTime, ActiveDesk or other standards known in the art, in which content may be connected by embedded hyperlinks for easy traversing. As noted, the multimedia information assembled for a broadcast session may be physically stored in multimedia database 309 or, alternatively, the BWS center 100 may contain pointers in local storage 312 within local servers 307 to locations where the multimedia information pieces are stored, either in the multimedia database 309 or remote servers 105.

The BWS Center 100 is illustratively linked directly to the client terminals 104 through a broadcast medium 310, which may be satellite transmission, cable television (CATV), wireless CATV, terrestrial television, ISDN, ADSL, fiber optic connections or any other medium that can reach multiple receivers simultaneously, preferably with high bandwidth. The BWS Center 100 is connected to network 102 over link 314, which can also be a conventional dial-up connection or a more robust digital channel, such as a T1 or T3 line. The BWS Center 100 also connects to the public switched telephone network (PSTN) 207 using conventional telephone connections 316. The client terminals 103 are not connected to BWS Center 100 directly, but rather to network 102 over connections 320, which may also be conventional dial-up connections or through modem connections to the telephone network 207, Internet Source Providers (ISP, not shown), and network 102, for example.

The client terminals 104, BWS Center 100, the conductor terminal 101, and the telephone operator stations 209 (but not client terminals 103) are all also illustratively coupled to the telephone network. It will be appreciated by persons skilled in the art that adaptations of the distributed architecture of FIG. 1, as well as other configurations of transmission links, will be possible.

The session conductor prepares a multimedia broadcast by using the multimedia authoring tool 306 to create, retrieve, or edit audio, video and text information from the local servers 307 or remote servers 105. The resulting assembled multimedia information is stored in the presentation server 312, to be retrieved and broadcast to the client terminals 103 and 104 as part of a multimedia session at a later, specified time through the communication server 308. For the client terminals 103, 104 which can only decode MPEG-2 bitstreams and do not have HTML processing capabilities, e.g. DirecTV set-top boxes, the communication server 308 will transcode the presentation of HTML pages into MPEG-2 format and push the resulting MPEG-2 bitstreams to the broadcast channels 310. For the client terminals 103, 104 which can directly act on HTML, the communication server 308 will function as a networking device, e.g. a router, that forwards the session information transparent to client terminal 103 through WAN interface 301 and to client terminal 104 through broadcast channels 310. The log-on process of the conductor and the scheduling and transmission of a broadcast session are controlled by the controller 303.

The client terminals 104 can receive the broadcast session directly from BWS Center 100 at the time specified by the session conductor. At the specified time, the session conductor logs on to the BWS Center 100 through the conductor terminal 101 over link 318. The session conductor communicates commands over the network 102 to the BWS Center 100 to transmit or "push" the multimedia content to the group of client terminals 103 and 104, which form the session audience. The BWS Center 100 transmits the multimedia session to client terminals 104 directly over broadcast channels 310, and to client terminals 103 through link 314 to the network 102 and then through links 320. The client terminals 103 and 104 may incorporate conventional television circuitry or a receiver capable of receiving a digital television signal. The BWS Center 100 broadcasts both digital and analog signals, if both analog and digital receivers are present. The session audience receives the audiovisual content of the transmitted session on their associated terminals, and may also engage in audio interaction with the session conductor or an operator associated with the session conductor during transmission. Audio interaction may be by using streamed Real Audio or other known sound transmission techniques over network 102, or through direct telephone connection over telephone network 207. (Though not shown, users of client terminals 103 may also use a conventional telephone.)

Figure 2:
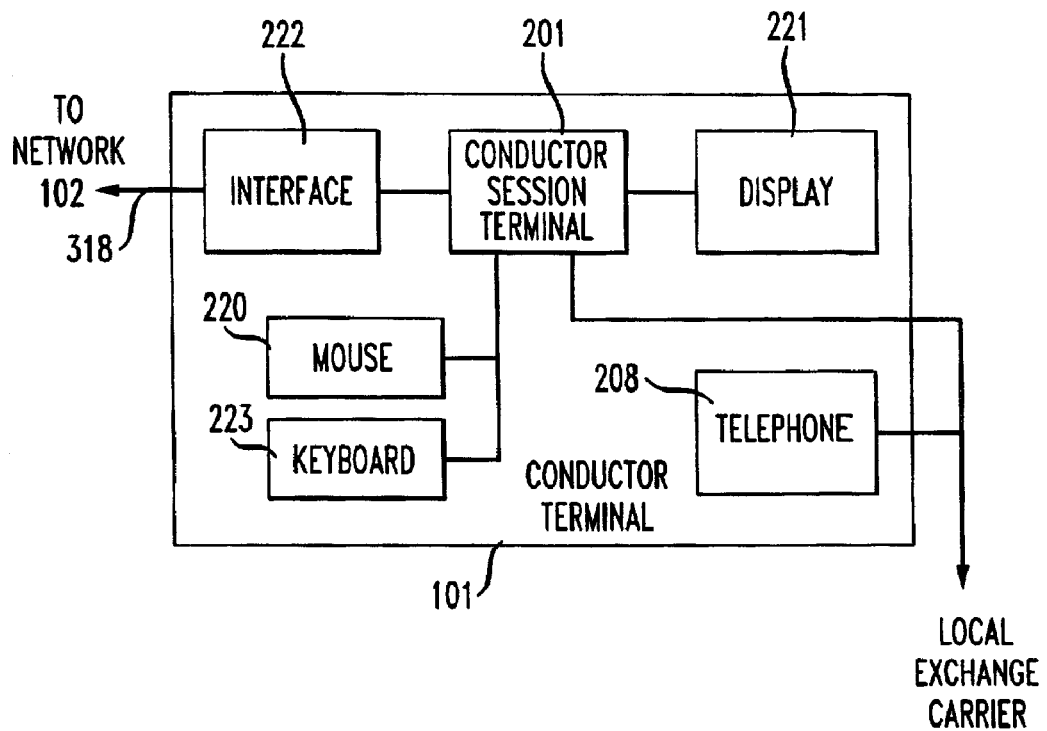
FIG. 2 shows a conductor terminal of FIG. 1.

FIG. 2 shows the conductor terminal 101 in more detail. The client terminals 103 are configured similarly to the conductor terminal 101. An interface 222 receives signals from and transmits signals to the network 102. The interface 222 is coupled to a conductor session terminal 201. The conductor session terminal 201 can also be a general purpose computer such as a personal computer, a workstation, or any other communication device capable of interacting with the network 102, illustratively including keyboard 220 and mouse 223 to receive graphically oriented input. The conductor session terminal 201 processes the received multimedia information and displays it on the display 221. The conductor session terminal 201 also transmits commands and data queries to the network 102 and from there to the BWS Center 100. The conductor session terminal 201 may also connect to the telephone network 207 through the local exchange carrier 206.

Figure 3:
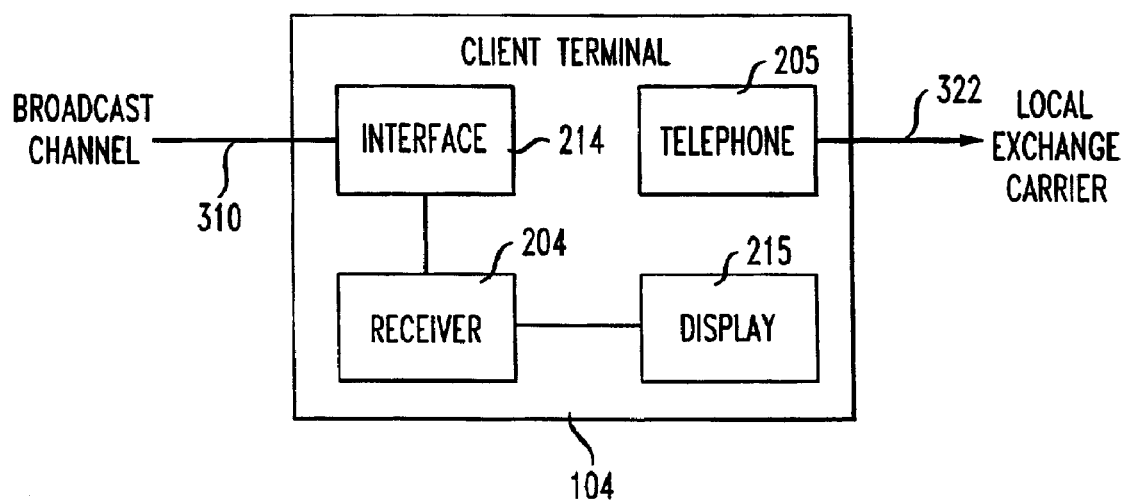
FIG. 3 shows a client terminal of FIG. 1.

FIG. 3 shows an exemplary client terminal 104 in more detail. In the configuration illustrated in FIG. 3, the broadcast session is encoded in MPEG-2 format, for example. An interface 214 receives the broadcast session signals. The interface 214 may be an antenna capable of receiving MPEG-2 signals (e.g., digital television signals broadcast by DirecTV™). The broadcast session signals are then sent to a receiver 204, which converts the digital signal to an analog video signal, in turn sent to a display 215. The display 215 may be a television or VGA monitor, for example. Alternatively, the digital signals may be used directly by a digital (HDTV or other) television.

The client terminal 104 includes a telephone 205 that is coupled over link 322 to the local exchange carrier 206 and thence to the telephone network 207. A person operating the client terminal 104 is also able to provide interactive audio communication with the session conductor using telephone 205.

FIG. 4 illustrates a block diagram of the BWS Center 100. The BWS Center 100 includes a data network interface 301, a memory 302, an audio bridge 304, a telephone network interface 305, a multimedia authoring tool 306, a multimedia on-demand database (MMOD) 309, a communication server 308 and local storage 312. The various components of the BWS Center 100 are all coupled to a data bus 300 and controlled by a controller 303.

The data network interface 301 receives a request from the session conductor to initiate a broadcast session. The session conductor uses the multimedia authoring tool 306 to create and edit multimedia documents. The multimedia documents are initially stored in the memory 302. Once the session conductor identifies the specific multimedia documents to assemble and present, the identified multimedia documents are loaded into the MMOD 309 which may be stored in local storage 312. The broadcast interface 308 broadcasts a data signal corresponding to the session conductor's multimedia presentation, retrieved from MMOD 309. If the telephone network interface 305 receives a request from the telephone network 207 to establish an audio link, the audio bridge 304 will forward a signal through the telephone network interface 305 to the telephone network 207, instructing the telephone network 207 to direct an audio signal to the specified broadcast receiver 204.

Because the information retrieved from the World Wide Web is generally in Hypertext Markup Language (HTML), it may be necessary to convert the HTML to a format that is compatible with the broadcast receiver 204. Thus, if the broadcast receivers 204 operate in the MPEG-2 format, the controller 303 will direct the broadcast interface 308 to encode the multimedia documents constituting the broadcast in MPEG-2 format.

Returning to FIG. 1, the session conductor logs onto the network 102 via the conductor session terminal 101 over link 318. The session conductor accesses the BWS Center 100 via an Internet browsing package, such as Netscape Navigator or Microsoft Internet Explorer, for example, and creates or edits the remotely stored multimedia document using the multimedia authoring tool 306. The session conductor may access websites of the network 102 such as multimedia databases contained in remote servers 105 to download new material to the BWS Center 100, or draw from multimedia databases provided in the BWS Center 100 or other sources for further source material.

To arrange a broadcast session, the session conductor specifies session parameters to the BWS Center 100. The session parameters include multimedia document IDs and MDIDs for documents (or portions of multimedia documents) stored in the MMOD that are to be "pushed" to the session audience during the broadcast session, and a delivery time parameter (DT) indicating at what time the broadcast session is to commence. The session parameters also include a participation list (PL) indicating which client terminals 103 and 104 will constitute the session audience, and a required bandwidth (RB) for the broadcast session.

The session conductor specifies the multimedia documents to present to the session audience, and directs the BWS Center 100 to broadcast the specified multimedia documents according to the MDIDs as the broadcast session. At the desired time indicated by the DT variable, the BWS Center 100 broadcasts the broadcast session to the broadcast receivers 204 over links 310 and allows the client terminals 103 access to the broadcast session over network 102. The session conductor's presentation may include, for example, training/teaching seminars, telemarketing, teleshopping and other multimedia presentations contained in the transmitted multimedia documents.

Only the client terminals 103 that are registered with the conductor terminal 101 specified in the participation list may access the broadcast session over network 102. The session conductor or a broadcast service assigns each client terminal 103 in the session audience a predetermined code, which may be delivered in advance of the session by email or otherwise. Users at the client terminals 103 enter their codes to obtain access to the broadcast session, which must match the predetermined code assigned by the conductor or the broadcast service.

During the broadcast session, the session conductor and the members of the session audience operating the client terminals 103 and 104 may individually interface with each other. Specifically, the members of the session audience operating the client terminals 103 and 104 may establish an interactive data link with the conductor session terminal 201. The interactive data link may include a "white board", which allows a hand-drawn sketch to be communicated via a real time video link, such as by using a commercially available Connectix QuickCam. Further, members of the session audience operating the client terminals 103 and 104 and the session conductor may enter private or public chat rooms, and exchange typed text messages.

The broadcast receivers 204 may establish an audio link with the session conductor and/or a panel of telephone operator stations 209 associated with the session conductor. To establish an audio link, users of the broadcast receivers 204 dial a code on telephone 205, which forwards a message to the BWS Center 100 requesting an audio link with the session conductor and/or the panel of telephone operator stations 209. The message is forwarded from the telephone 205 through the local exchange carrier 206 to telephone network 207, and thence to BWS Center 100. In response, the BWS Center 100 transmits a signal directing audio information communicated by the users of the broadcast receivers 204 to either the session conductor's telephone 208 or the panel of telephone operator stations 209. Operators at the panel of telephone operator stations 209 may take orders from the session audience for merchandise presented by the session conductor or may answer questions regarding the presentation, for example.

In FIG. 3, the client terminal 104 is shown with a broadcast receiver 204 that receives a signal broadcast in the MPEG-2 format. In an alternate embodiment, the broadcast receiver 204 has HTML processing capability built in. In this case, the signal sent from the BWS Center 100 would be in the HTML format, eliminating the need to encode the output of the MMOD 309 from HTML to MPEG-2 format.

Figure 5:
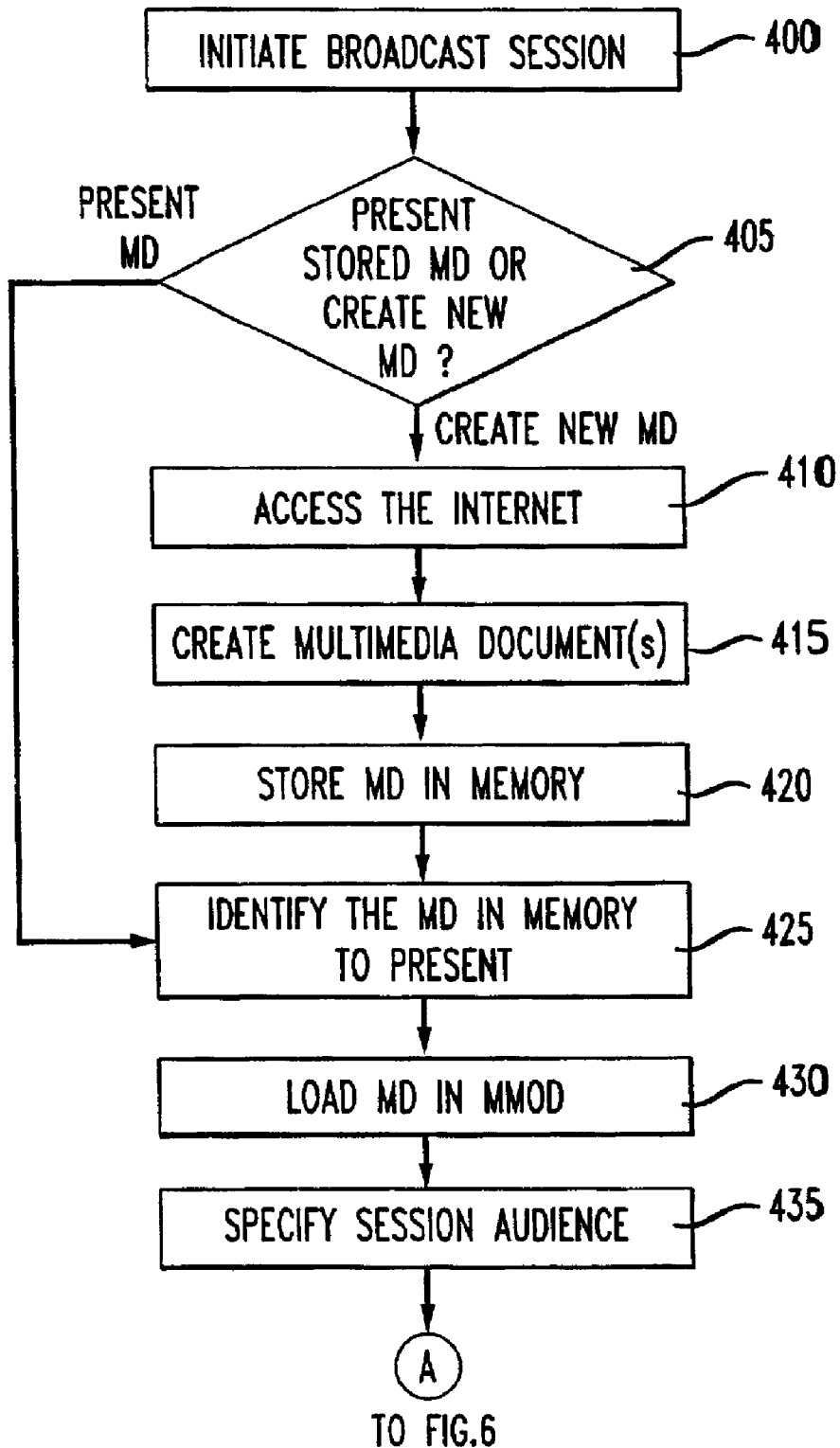
FIGS. 5 and 6 show flowcharts of a broadcast process according to the invention.
Figure 6:
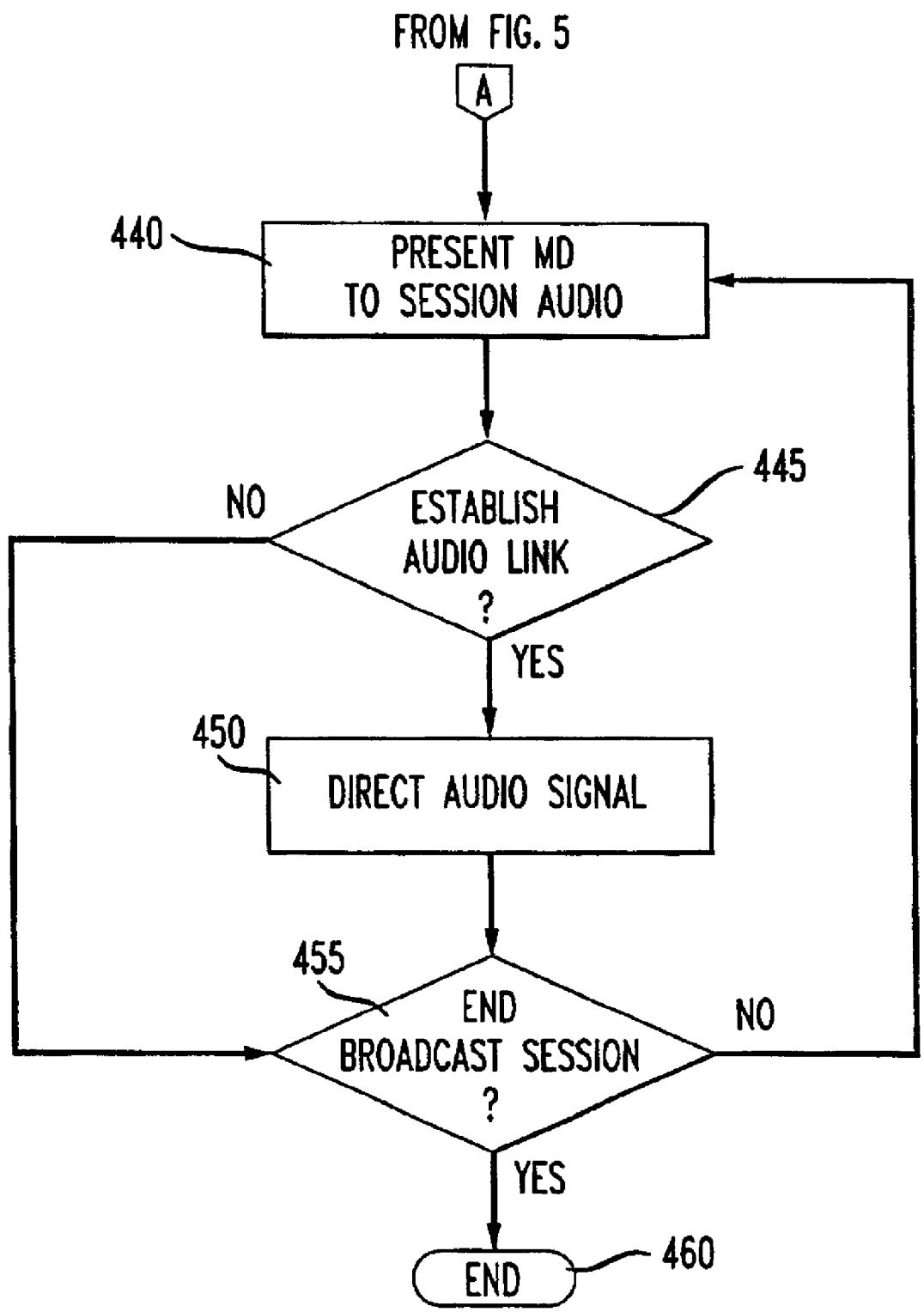

Operation of an embodiment of the broadcast multimedia communications system 100 is described with reference to the flow diagrams of FIGS. 5 and 6.

In step 400, the controller 303 receives a request from the session conductor, via the data network interface 301, to initiate a broadcast session and goes to step 405. In step 405, the controller 303 prompts the session conductor to indicate whether to present multimedia documents already stored in the memory 302 or local storage 312, or whether to create new multimedia documents. If the session conductor wishes to present multimedia documents already stored in the memory 302, the controller goes to stop S425. In step 425, the controller 303 prompts the conductor to identify the multimedia documents (MDIDs) in the memory 302 that will be presented. In step 430, the controller 303 loads the identified multimedia documents into the MMOD 309 and goes to step 435.

If, in step 405, the session conductor indicates a wish to create or append new multimedia documents, the controller 303 goes to step 410. In step 410, the controller 303 permits the session conductor to access various websites and databases linked to the network 102 and, in step 415, directs the multimedia authoring tool 306 to retrieve audio, video and/or text information specified by the conductor from the Internet to create multimedia documents. In step 420, the controller 303 stores the multimedia documents in the memory 302 and proceeds to step 425.

In step 435, the controller 303 prompts the session conductor to specify a session audience. The session conductor specifies the session audience by entering the predetermined codes corresponding to the broadcast receivers 204 that the session conductor wishes to receive the broadcast session. The session conductor further specifies the session audience by entering into the participation list predetermined codes corresponding to the client terminals 103 that the session conductor wishes to have access to the broadcast session, via network 102.

In step 440 (FIG. 6), the controller 303 directs the broadcast interface 308 to broadcast a data signal corresponding to the session conductor's presentation to the session audience. The controller 303 allows the client terminals 103 to access the broadcast session if the logon code entered by the operators at the client terminals 103 matches the codes specified by the session conductor. The predetermined codes that correspond to the broadcast receivers 204 of the session audience indicates to the controller 303 whether each of the broadcast receivers 204 have HTML processing capabilities. Since the data signal broadcast by the broadcast interface 308, corresponding to the broadcast session, is in HTML format, if the broadcast receivers 204 are not next-generation receivers having that capability, the controller 303 will direct the broadcast interface 308 to transcode the data signal from the HTML format into MPEG-2 format before transmission to the broadcast receivers 204 of the session audience. However, if the broadcast receivers 204 of the session audience are capable of receiving such data, then the controller 303 will direct the broadcast interface 308 to directly transmit the HTML data signal.

In step 445, the controller 303 determines whether to establish an audio link at step 445. If the session conductor or an operator on the panel of operator stations 209 sends a request to establish an audio link with one or more members of the session audience, or vice versa, the controller 303 goes to step 450 to establish an audio link. If the session conductor or an operator on the panel of operator stations 209 dials a predetermined code on their telephones, the controller 303 will receive a request to establish an audio link with one or more members of the session audience. The controller 303 will then direct the audio bridge 304 to forward a signal through the telephone network interface 305 to the telephone network 207, to direct the real-time audio signal to the specified members of the session audience. In step 450, the telephone network 207 will forward the real-time audio signal through the local exchange carrier 206 to the telephone 205 of the specified members of the session audience. This procedure will occur in reverse order if any of the members of the session audience wish to establish an audio link with either the session conductor or the panel of operator station 209.

If, however, the controller 303 does not receive a request to establish an audio link at step 445, then the controller 303 proceeds directly to step 455 where it determines whether to terminate the session broadcast. If the session conductor enters a command to terminate the session broadcast, the controller 303 goes to step 460 and terminates the session broadcast. If the session conductor has not entered a command to end the broadcast session, the controller 303 returns to step 440.

As shown in FIG. 4, the BWS Center 100 is preferably implemented on a programmed general purpose computer. However, as will be appreciated by persons skilled in the art, the BWS Center 100 can also be implemented on a special purpose computer, a programmed microprocessor or microcontroller and peripheral integrated circuit elements, an ASIC or other integrated circuit, a hard wired electronic or logic circuit such as a discrete element circuit, a programmable logic circuit such as a PLD, PLA or PAL, or the like. In general, any programmable machine capable of implementing the flow charts shown in FIGS. 5A and 5B can be used to implement the BWS Center 100.

As shown in FIG. 3, the memory 302 is preferably implemented using electronic memory, such as static or dynamic RAM or flash memory. However, the memory 302 can also be implemented using other means such as magnetic or other media.

While this invention has been described in conjunction with the specific embodiments outlined above, alternatives, modifications and variations will be apparent to those skilled in the art. The invention is accordingly intended to be limited only by the following claims.

What is claimed is:

1. A method for broadcasting information over a network, comprising:

identifying, by a broadcast session conductor, a broadcast audience to receive a broadcast session;

determining and locating in real time, based on a profile of the broadcast audience, items to be broadcast during the broadcast session that are located at different locations;

collecting the items from their location to a central broadcast system, wherein the locations can include floppy or hard drive, websites, remote server or CDs;

creating, by the broadcast session conductor, the broadcast session for the identified broadcast audience based on audiovisual information; and broadcasting the broadcast sessions in real time for reception only by the identified broadcast audience over the network or providing secured access to the broadcast audience for manual retrieval of the broadcast session.

2. The method of claim 1, wherein the step of creating the broadcast session comprises:

retrieving information from an audiovisual database;

creating a multimedia document based on the retrieved information;

specifying a length of the broadcast session;

specifying a required bandwidth for the broadcast session;

specifying a participation list; and saving the broadcast session in a database.

3. The method of claim 2, wherein the multimedia document is created using a multimedia authoring tool.

4. The method of claim 2, wherein the multimedia document includes at least two of text, video, and audio data.

5. The method of claim 1, wherein the broadcast audience is designated by providing members of the broadcast audience with a code, the code being entered at a terminal of each of the members to access the broadcast session.

6. The method of claim 5, wherein a controller queries the terminal of each of the members to determine if the code is correct.

7. The method of claim 1, wherein the broadcast session is broadcast in MPEG-2 format.

8. The method of claim 1, wherein the broadcast session is broadcast in HTML format.

9. The method of claim 1, wherein the broadcast session is broadcast using at least one of satellite television, cable television, wireless cable television, and broadcast television.

10. The method of claim 1, further comprising the step of establishing an audio link between members of the broadcast audience and the broadcast session conductor.

11. The method of claim 10, wherein the audio link communicates transaction information related to the broadcast session.

12. The method of claim 5, wherein the broadcast session is made available to predetermined terminals connected to the network, the predetermined terminals being designated by the broadcast session conductor specifying the code.

13. The method of claim 11, wherein users of the predetermined terminals and the broadcast session conductor communicate using telephone stations, white boards and chat rooms.

14. The method of claim 1, wherein the network is the Internet.

15. A system for broadcasting information over a network, comprising:

a profile determining device that determines characteristics of a broadcast audience;

a locating and retrieval device for locating and retrieving items in real time for assembly in a broadcast session, wherein a location can include floppy or hard drive, website, remote server or CDS;

a database that stores broadcast sessions created by a broadcast session conductor, for an identified broadcast audience from audiovisual information; and a broadcast device that broadcasts the broadcast sessions in real time for reception only by the identified broadcast audience over the network, the broadcast audience being identified by the broadcast session conductor, before the broadcast.

16. The system of claim 15, wherein the broadcast session comprises:

a multimedia document, the multimedia document including at least two of audio, video, and text data;

a broadcast length; and a broadcast bandwidth.

17. The system of claim 15, wherein the broadcast session audience is designated by providing each member of the broadcast session audience with a code, the code being entered at a terminal of a member of the broadcast session audience to access the broadcast session.

18. The system of claim 15, wherein the broadcast session is broadcast in MPEG-2 format.

19. The system of claim 15, wherein the broadcast session is broadcast in HTML format.

20. The system of claim 15, further comprising a broadcast center, the broadcast center transmitting the broadcast session by at least one of satellite television, cable television, wireless cable television, and broadcast television.

21. The system of claim 15, further comprising an audio link, the audio link connecting members of the broadcast session audience and the broadcast session conductor.

22. The system of claim 21, wherein the audio link communicates transaction information related to the session broadcast.

23. The system of claim 17, wherein the broadcast session is made available to predetermined terminals connected to the Internet, the predetermined terminals designated by a broadcast session conductor specifying the code.

24. The method of claim 1, wherein the broadcast session is at least one of narrowcast, multicast, switched connection and encrypted transmission.

25. The method of claim 1, wherein the broadcast session and the audiovisual information are stored in and retrieved from at least one database.

26. The method of claim 10, wherein the audio link is established via one or more of a telephone network and a data network, audio communication received from the audio link may be selectively broadcast as part of the broadcast session.

27. The method of claim 1, further comprising establishing a white board space as a communication link between one or more members of the broadcast audience and a broadcast session conductor.

* * * * *